US012277872B2

(12) United States Patent
Sampson

(10) Patent No.: US 12,277,872 B2
(45) Date of Patent: *Apr. 15, 2025

(54) UNDERGROUND DAMAGE PREVENTION METHOD AND APPARATUS

(71) Applicant: Roger Sampson, North Massapequa, NY (US)

(72) Inventor: Roger Sampson, North Massapequa, NY (US)

(73) Assignee: New York 811, Inc., Bohemia, NY (US)

(*) Notice: Subject to any disclaimer, the term of this patent is extended or adjusted under 35 U.S.C. 154(b) by 124 days.

This patent is subject to a terminal disclaimer.

(21) Appl. No.: 18/137,848

(22) Filed: Apr. 21, 2023

(65) Prior Publication Data

US 2023/0252907 A1    Aug. 10, 2023

Related U.S. Application Data

(63) Continuation of application No. 17/001,246, filed on Aug. 24, 2020, now Pat. No. 11,645,937.

(60) Provisional application No. 62/891,005, filed on Aug. 23, 2019.

(51) Int. Cl.
 *G09B 9/04*    (2006.01)

(52) U.S. Cl.
 CPC .................... *G09B 9/04* (2013.01)

(58) Field of Classification Search
 CPC .......... G09B 19/24; G09B 9/04; G09B 9/042; G09B 5/00; G09B 7/00; E02F 9/205; E02F 9/2004
 See application file for complete search history.

(56) References Cited

U.S. PATENT DOCUMENTS

| 5,888,069 | A | 3/1999 | Romanoff |
| 9,666,095 | B2 | 5/2017 | Swiderski |
| 2002/0186348 | A1 | 12/2002 | Covannon |
| 2014/0060216 | A1* | 3/2014 | Smith ........................ E02F 9/16 73/865.6 |
| 2019/0371196 | A1* | 12/2019 | Pittman ..................... G09B 9/05 |

OTHER PUBLICATIONS

Shin, et al. KR-20140117783 "Train Apparatus for Crane Operation" (Year: 2014).*
Kahyan et al. WO 2017155488, A Forklift Training Simulator System (Year: 2017).*
Han et al. KR 20210131105 Excavator Remote Control Simulator (Year: 2021).*

* cited by examiner

*Primary Examiner* — Robert J Utama
(74) *Attorney, Agent, or Firm* — The Farrell Law Firm, P.C.

(57) ABSTRACT

Disclosed is an excavator safety simulator and methods for preventing damage to existing underground equipment prior to excavation by using a Virtual Reality (VR) environment with underground facilities and markings, and real world examples of dynamic climate scenarios and challenges that an excavator will likely encounter.

10 Claims, 3 Drawing Sheets

UNDERGROUND DAMAGE PREVENTION METHOD AND APPARATUS

PRIORITY

This application is a Continuation application of U.S. patent application Ser. No. 17/001,246, which was filed on Aug. 24, 2020, and claims priority under 35 U.S.C. § 119(e) to U.S. Provisional Application Ser. No. 62/891,005, which was filed in the U.S. Patent and Trademark Office on Aug. 23, 2019, the contents of each of which are incorporated herein by reference.

BACKGROUND

1. Field

The present invention relates generally to excavation, and more particularly, to a method and apparatus for preventing damage to existing underground equipment prior to excavation.

2. Description of the Related Art

Recently, efforts have been made in various municipalities to provide advancements in underground damage prevention. Such advancements require re-examination of processes, utilization of the latest technology and constant evaluation of possible new solutions in order to maintain the safety of workers and the community, all the while continuously striving to prevent damage to the underground facility infrastructure that is vital in human lives, including but not limited to pipes, conduits, ducts, wiring, manholes, vaults, tanks, tunnels, and any encasement containing such underground facilities.

In order to facilitate the necessary advances, excavator training and education on new and improved technologies and equipment are continuously required to protect this vital underground environment. Specifically, the airline industry long ago recognized flight simulator technology as vital in enhancing aviation safety, and incorporated simulators as primary training mechanisms in simulating ever-changing flight conditions and emergency situations.

With the flight simulator, flight instructors can change numerous parameters of a flight situation to gauge the abilities of potential pilots and train existing pilots to react to changing scenarios, as well as create new safety parameters for the industry. The flight simulator has also enhanced the critical thinking and instant decision-making of pilots and potential pilots.

Currently, Federal Aviation Administration (FAA) regulations require pilots to continuously train in flight simulators in order to achieve certain qualifications. Indeed, simulators were instrumental in improving aviation safety records while also providing the FAA with vital feedback in making regulatory decisions involving aviation safety.

While improvements have been sought in excavation, the prior art is devoid of any simulation method for training individuals utilizing an excavation simulator.

Given the significant advances that have been made in the aviation industry with the use of simulators, as well as the ongoing efforts to mitigate underground damage in excavation, there is a need in the art for a method and apparatus that enable the excavation industry to train workers in preventing underground damage prior to the actual time of excavation.

SUMMARY

The present disclosure has been made to address at least the above-mentioned problems and/or disadvantages and to provide at least the advantages described below.

Accordingly, an aspect of the present disclosure is to provide an excavator safety simulator for preventing damage to existing underground equipment prior to excavation by using a Virtual Reality (VR) environment with underground facilities and markings, and real world examples of dynamic climate scenarios and challenges that an excavator will likely encounter.

Another aspect of the present disclosure is to provide a simulation method for training excavators, by which the excavator safety simulator is used for enhancing the critical thinking skills of the excavator in congested underground environments while providing no risk to life and no possible damage to existing underground infrastructure.

Another aspect of the present disclosure is to provide a mobile excavator safety simulator utilizing VR locator training simulation to eliminate the need for a fixed training facility site.

Another aspect of the present disclosure is to provide a simulation method for training excavators utilizing Augmented Reality (AR) technology.

According to an aspect of the present disclosure, an excavator training simulator includes a vehicle having a driver's seat and a front passenger seat, and an open space behind the driver's seat and the front passenger seat, the open space including a VR workspace through which VR data related to excavation simulation is transmitted and received, a seating area configured to be occupied by at least one of a trainee and an operator, a steering wheel configured for use by the operator to adjust a position of the training apparatus relative to the VR data, a slide out configured to receive a magnetic strip card insertion, by the trainee, enabling input of ticket information and determining of an automated positive response (APR) status, the APR status indicating a status of an excavation location request of the operator, a training station located aft of the driver's seat and configured to be occupied by the operator, and a computer station located in a forward area of the open space near the driver's seat and the front passenger seat and including software by which the excavation simulation is run.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION

Figure 1:
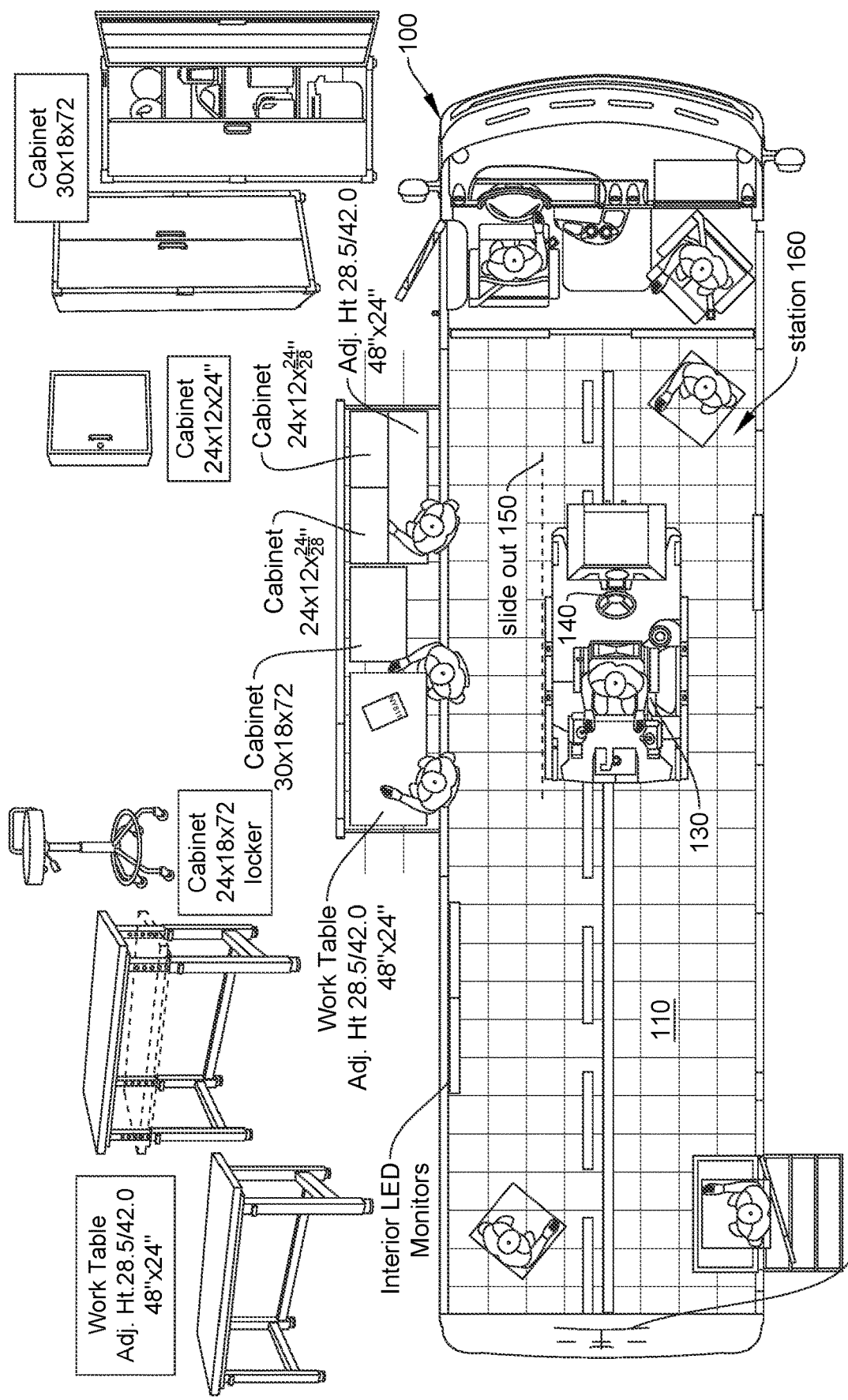
FIG. 1 illustrates a schematic diagram of the excavation simulator, according to an embodiment.

Embodiments of the present disclosure will be described herein below with reference to the accompanying drawings. However, the embodiments of the present invention are not limited to the specific embodiments and should be construed as including all modifications, changes, equivalent devices and methods, and/or alternative embodiments of the present disclosure. Descriptions of well-known functions and/or configurations will be omitted for the sake of clarity and conciseness.

The terms and words used in the following description and claims are not limited to their dictionary meanings, but are merely used to enable a clear and consistent understanding of the present invention. Accordingly, it should be apparent to those skilled in the art that the following description of embodiments of the present invention is provided for illustrative purposes only and not for the purpose of limiting the present invention as defined by the appended claims and their equivalents.

Singular terms "a," "an," and "the" include plural references unless the context clearly dictates otherwise. For example, reference to "a component surface" includes reference to one or more of such surfaces.

The embodiments are described herein by way of illustration only and should not be construed in any way to limit the scope of the present invention. Those skilled in the art will understand that the principles of the present invention may be implemented in any suitably arranged electronic device.

As used herein, the term "substantially" indicates that the recited characteristic, parameter, or value need not be achieved exactly, but that variations such as tolerances, measurement errors, measurement accuracy limitations and other factors known to those of ordinary skill in the art, may occur in amounts that do not preclude the effect the characteristic was intended to provide.

The expressions "have," "may have," "include," and "may include" as used herein indicate the presence of corresponding features, such as numerical values, functions, operations, or parts, and do not preclude the presence of additional features. The expressions "A or B," "at least one of A or/and B," or "one or more of A or/and B" as used herein include all possible combinations of items enumerated with them. For example, "A or B," "at least one of A and B," or "at least one of A or B" indicate (1) including at least one A, (2) including at least one B, or (3) including both at least one A and at least one B.

Terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. A first element may be referred to as a second element without departing from the scope the present invention, and similarly, a second element may be referred to as a first element.

When a first element is "operatively or communicatively coupled with/to" or "connected to" another element, such as a second element, the first element may be directly coupled with/to the second element, and there may be an intervening element, such as a third element, between the first and second elements. To the contrary, when the first element is "directly coupled with/to" or "directly connected to" the second element, there is no intervening third element between the first and second elements.

All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present invention.

For example, the present application uses the terms "ticket", which refers to the legal document required by an excavator to be submitted to a One Call Notification System detailing the scope of work in relation to the intent to excavate, "shallow cover", which refers to when a facility is only buried just below the surface and is not deep enough to meet acceptable industry depths of facility, and "hand digging", which refers to the need arising when attempting to verify a depth and run a buried facility so as not to risk or endanger the facility, or when excavation with mechanized equipment is prohibitive.

FIG. 1 illustrates a schematic diagram of the excavation simulator according to an embodiment.

Referring to FIG. 1, the excavator simulator is a vehicle 100 (hereinafter, "training trailer"), such as a mobile van or a closed truck with open space behind the driver and front passenger seats, and includes a simulator environment within the open space and having a VR workspace 110 through which VR data is transmitted and received between the individual being trained (hereinafter, "trainee") and a simulation screen 120, a seating area 130 in which the trainee sits and reacts to the simulation, and a steering wheel 140 to facilitate moving the position of the training trailer 100 in the VR world, not the training trailer 100 itself. The trainee may use the steering wheel 140 to adjust the location of the virtual excavation machine in the virtual excavation site, relative to the excavation occurring in the virtual environment. The steering wheel 140 may also be utilized by the operator. Thus, the seating area 130 is configured to be occupied by both the trainee and the operator, when necessary.

A slide out 150 is used for submission of excavation details by the trainee to input ticket information and check Automated Positive Response (APR) status. The APR is part of the ticket process and establishes a single point of contact between member operators and excavators for communicating the status of an excavation location request as provided by the member operators. An instructor operates the VR training program from a station 160 which may be located aft of the driver's seat. A computer including the software by which the simulator is run is housed in the forward area of the training trailer 100.

Based on this configuration, all excavator training may be conducted by an operator from within the training trailer 100, thereby enabling complete in-person excavator training. Furthermore, liaisons will create a training schedule and on-going education for trainees, thus obviating the need for trainees to travel to training centers. In at least these manners, a more convenient and user-friendly training method for excavators is realized.

In addition to the foregoing, conventional office equipment such as cabinets, television (TV) monitors and additional seating and workspace areas may be provided in the training trailer 100, as shown.

Figure 2:
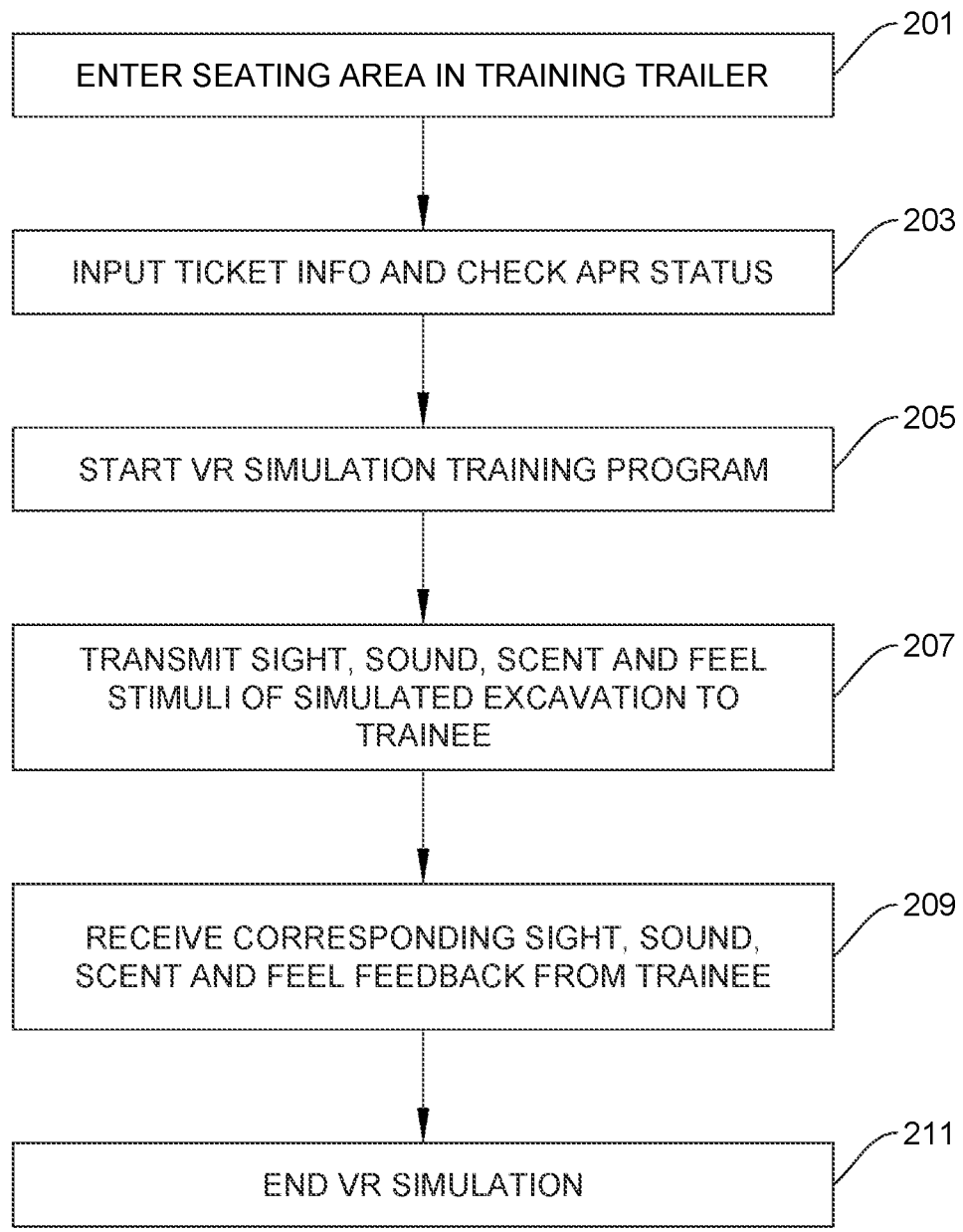
FIG. 2 illustrates a method of training individuals utilizing the excavation simulator of FIG. 1, according to a first embodiment.

FIG. 2 illustrates a method of training individuals utilizing the excavation simulator of FIG. 1 according to a first embodiment of the present invention.

Referring to FIG. 2, in step 201, the trainee enters the seating area in the training trailer.

In step 203, the trainee inputs the ticket information and checks his or her APR status. Alternatively, the trainee may not check his or her APR status.

In step 205, the operator starts the VR simulation training program for the trainee seated in the seating area.

In step 207, as part of the VR simulation training program, the excavator simulator training includes four dimensions of dynamic sensory education. That is, participants are fully immersed by using influenced sensory stimuli including sight, sound, scent and feel, that is elicited from constantly changing excavation situations and is transmitted to the trainee through the excavation simulation.

Through sight, the trainee uses the full surround VR equipment during excavator simulation. Through sound, the trainee is auditorily provided with excavation cues, noise, and outer interference normally experienced during an excavation. Through scent, triggers are implemented, such as permeation of a gas odor being released from a damaged gas line or exhaust odor from excavator equipment (e.g., a backhoe) operation. Through feel, the trainee will experience the tactile reaction through forced feedback of the training equipment, such as when the trainee makes contact with a water line releasing sprayed water, in an errant equipment operation. In this example, the release of sprayed water may also produce a related sound.

In step 209, the sight, sound, scent and feel feedback is received from the trainee, by the operator through the VR simulation, in response to the corresponding sight, sound, scent and feel stimuli transmitted to the trainee in step 207. This feedback is then saved in the computer.

In step 211, the VR simulation training program is ended.

Rather than training excavators how to operate a backhoe, therefore, this method enhances the knowledge of trainees in order to better prepare the trainees to safely excavate in and around vital underground infrastructure and to better educate the excavation industry on safe excavation.

That is, the excavation simulator according to the first embodiment provides excavation training and simulation through VR. The excavation simulator is data collection-focused by determining the tendencies and behaviors of trainees that are positive (e.g., which involve successful, damage-free excavation) and are negative (e.g., which tend to cause damage to underground infrastructure). Based on the collected data, the method according to the first embodiment may offer informed recommendations on excavation safety to the excavation industry, as well as better train individuals on improved excavation.

For example, the excavation simulator may determine whether the trainee is violating a tolerance zone, which is a pre-defined horizontal distance extending from the outer edge or wall of a line or pipe that runs underground by between 18-30 inches on either side of the line or pipe.

As another example, the excavation simulator may determine whether the trainee is paying sufficient attention to visual, auditory, olfactory and tactile clues for safe excavation. If not, through the method of the first embodiment, the parameters of the simulation may be changed to encourage more focused and consistent attention to the excavation. In this manner, the method of the present invention is not static, but rather, is dynamic. The feedback from the trainee is constantly monitored to dynamically impact the trainee for safer excavation training.

The VR training in the first embodiment includes virtual locating of buried facilities, technician locating and marking the buried facilities, verifying the APR status of excavators, marking the excavation field prior to commencing virtual excavation, educating trainees on the tolerance zones and when to opt for hand-digging as opposed to backhoeing, and final excavation with the sight, sound, scent and feel feedbacks. That is, there will be substantial training capability even if a trainee is compromised with respect to at least one of these four types of feedback. Based on this immersive training, various parameters are dynamically altered to enhance the training environment and mimic both expected and unexpected challenges in the real world.

Through the training method in the first embodiment, APRs can be omitted, information on the ticket can be corrected, mis-marks of underground facilities can be demonstrated, shallow cover can be demonstrated, and the instances when hand-digging would be needed around buried facilities can be revealed to trainees, among other benefits.

Figure 3:
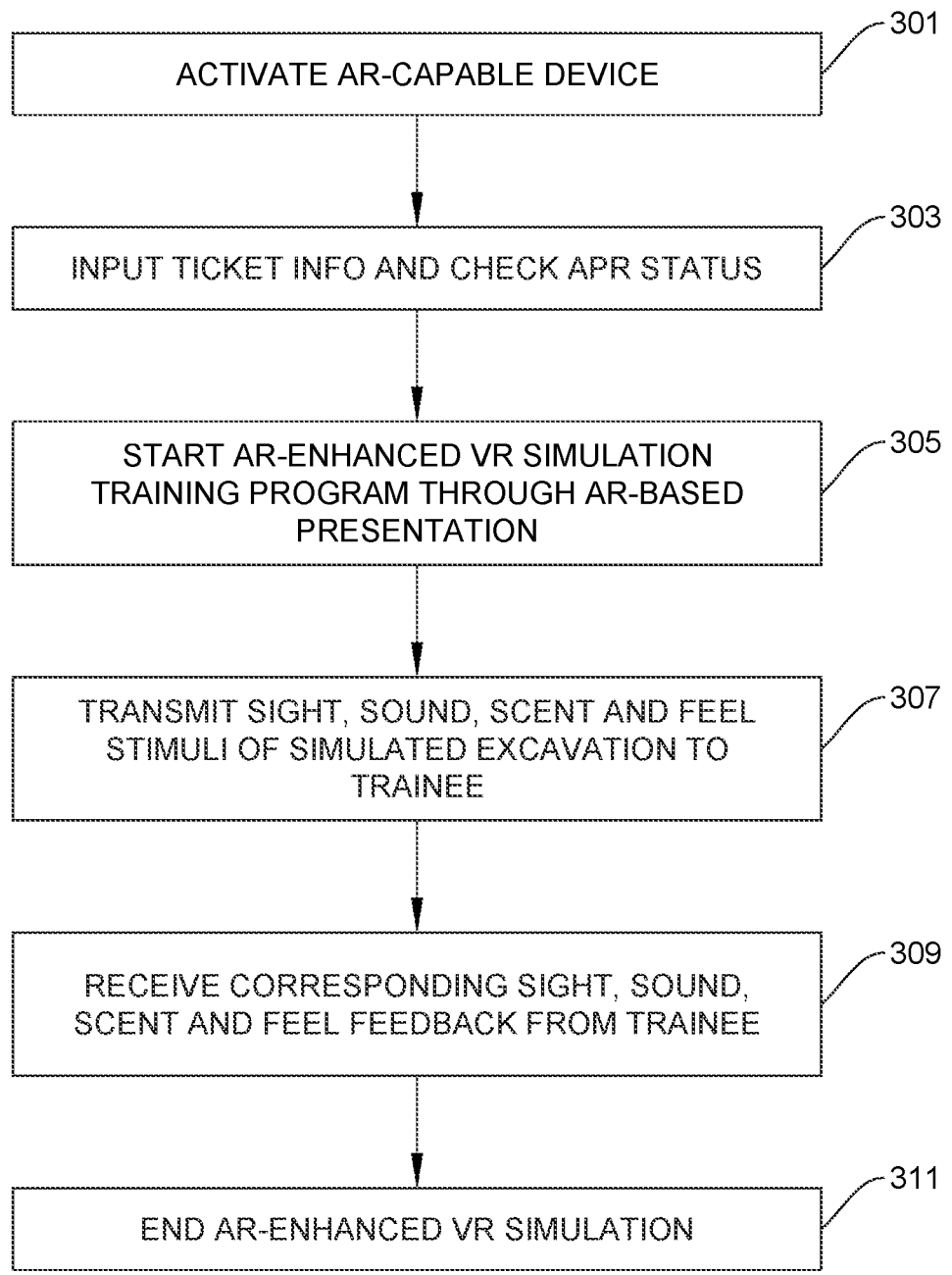
FIG. 3 illustrates a method of training individuals utilizing the excavation simulator of FIG. 1, according to a second embodiment.

FIG. 3 illustrates a method of training individuals utilizing the excavation simulator of FIG. 1 according to a second embodiment of the present invention.

Referring to FIG. 3, AR technology is incorporated into the training method described above in FIG. 2, thereby providing an AR-enhanced VR simulation.

Specifically, in step 301, the trainee activates the device for presenting AR, such as a heads-up display (HUD), holographic display, smart glasses, or any type of AR-capable smartphone or handheld device.

In step 303, the trainee inputs the ticket information and checks his or her APR status. Alternatively, the trainee may not check his or her APR status. In the AR-enhanced VR simulation, the trainee may or may not be seated in the training trailer. That is, the trainee may be utilizing the AR-enhanced VR simulation in any other suitable location, such as a home or office.

In step 305, the operator starts the AR-enhanced VR simulation training program for the trainee through an AR-based presentation. Alternatively, in this second embodiment, the trainee may act as the operator.

In step 307, sensory stimuli including sight, sound, scent and feel of a simulated excavation is transmitted to the trainee via the AR device.

In step 309, the sight, sound, scent and feel feedback is received from the trainee, by the operator through the VR simulation, in response to the corresponding sight, sound, scent and feel stimuli transmitted to the trainee in step 307. This feedback is then saved in the computer.

In step 311, the AR-enhanced VR simulation training program is ended.

For example, an operator may need to present a known difficult excavation scenario to a trainee. In this case, data regarding this scenario may be presented to the trainee via AR, such that an excavation company may be pre-trained on this scenario prior to the actual excavation.

Similar to how surgical procedures are performed prior to the actual procedure, the AR technology provides trainees and excavation companies the ability to anticipate potential challenges within the excavation site, without disturbing or contacting the existing underground facilities.

As described above, the AR technology in excavation training according to the second embodiment may be realized using an enabled cellular phone or an AR-enabled headset. AR in this second embodiment uses existing data sets from various facility owners, in a manner in which those data sets can be superimposed into an real world, real time location. Thus, the operator is given the ability to see those facilities underground in relation to the planned excavation.

By utilizing the teachings in the above embodiments, similar to prevalent requirements in the airline industry, it is anticipated that excavation companies will be required to train potential excavators and continuously educate existing excavators in simulation training, as a prerequisite for individuals obtaining and maintaining an excavator certificate and/or license.

Embodiments of the present invention disclosed in the specification and the drawings are only particular examples disclosed in order to easily describe the technical matters of the present invention and assist with comprehension of the present invention, and do not limit the scope of the present invention. Therefore, in addition to the embodiments disclosed herein, the scope of the embodiments of the present invention should be construed to include all modifications or modified forms drawn based on the technical aspects of the embodiments of the present invention.

While the present invention has been described with reference to various embodiments, various changes may be made without departing from the spirit and the scope of the present invention, which is defined, not by the detailed description and embodiments, but by the appended claims and their equivalents.

What is claimed is:

1. An excavator training simulator, comprising:
    a virtual reality (VR) workspace through which VR data related to excavation simulation is transmitted and received,
    a seating area configured to be occupied by a trainee and an operator,
    a steering wheel configured for use by the operator to adjust a position of the training apparatus relative to the VR data,
    a slide out configured to receive a magnetic strip card insertion, by the trainee, enabling input of ticket information and determining of an automated positive response (APR) status, the APR status indicating a status of an excavation location request of the operator,
    a training station configured to be occupied by the operator, and
    a computer station including software by which the excavation simulation is run.

2. The excavation training simulator of claim 1,
    wherein the VR workspace is configured to transmit sensory stimuli to the trainee while the trainee is seated in the excavation training simulator, based on the software by which the excavation simulation is run.

3. The excavation training simulator of claim 2, further comprising:
    a simulation screen,
    wherein feedback is received from the trainee, through the software, as the trainee performs the simulated excavation by viewing the simulation screen.

4. The excavation training simulator of claim 3,
    wherein the sensory stimuli transmitted to the trainee is elicited from dynamic excavation situations in the software by which the excavation simulation is run.

5. An excavator training method utilizing the excavating training simulator of claim 1, comprising:
    entering the excavation training simulator, by a trainee;
    activating an excavator simulation training program, by an operator;
    transmitting sensory stimuli of a simulated excavation to the trainee; and
    receiving corresponding sensory feedback from the trainee.

6. The method of claim 5,
    wherein the sensory stimuli is transmitted while the trainee is seated in the excavation training simulator.

7. The method of claim 6,
    wherein the feedback is received from the trainee, through the training program, as the trainee performs the simulated excavation by viewing a simulation screen.

8. The method of claim 7,
    wherein the training program is installed in a computer by which the simulated excavation is run and is housed in the excavation training simulator.

9. The method of claim 7,
    wherein the sensory stimuli received by the trainee is elicited from dynamic excavation situations in the training program.

10. The method of claim 7,
    wherein the feedback is further received via a virtual reality (VR) workspace through which VR data related to the excavation simulation is transmitted and received, the VR workspace being located between at least the seated trainee and the simulation screen.

* * * * *